(12) United States Patent
Ficara et al.

(10) Patent No.: US 12,517,212 B2
(45) Date of Patent: Jan. 6, 2026

(54) FULL MESH FINE TIME MEASUREMENT

(71) Applicant: Cisco Technology, Inc., San Jose, CA (US)

(72) Inventors: Domenico Ficara, Essertines-Sur-Yverdon (CH); Amine Choukir, Ecublens (CH); Pascal Thubert, Roquefort les Pins (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 557 days.

(21) Appl. No.: 18/149,389

(22) Filed: Jan. 3, 2023

(65) Prior Publication Data

US 2024/0219511 A1 Jul. 4, 2024

(51) Int. Cl.
*G01S 5/02* (2010.01)
(52) U.S. Cl.
CPC .................. *G01S 5/0289* (2013.01)
(58) Field of Classification Search
None
See application file for complete search history.

(56) References Cited

U.S. PATENT DOCUMENTS

| | | |
|---|---|---|
| 2015/0365805 A1 | 12/2015 | Bajko et al. |
| 2017/0374513 A1* | 12/2017 | Venkatraman ............ G01S 5/14 |
| 2019/0132762 A1 | 5/2019 | Zhu et al. |
| 2021/0120556 A1 | 4/2021 | Segev et al. |
| 2021/0282108 A1 | 9/2021 | Smith et al. |

OTHER PUBLICATIONS

Martin-Escalona et al., "Passive Round-Trip-Time Positioning in Dense IEEE 802.11 Networks," Electronics 2020, 9, 1193. https://doi.org/10.3390/electronics9081193.

* cited by examiner

*Primary Examiner* — Myron Wyche
(74) *Attorney, Agent, or Firm* — Patterson + Sheridan, LLP

(57) ABSTRACT

Techniques for wireless communication are disclosed. These techniques include defining a message schedule for fine time measurement (FTM) at a first wireless access point (AP). The techniques further include broadcasting the message schedule to a plurality of wireless stations (STAs) from the first AP. The techniques further include receiving, at the first AP, a plurality of FTM messages from the plurality of STAs, the messages transmitted by the plurality of STAs based on the message schedule. The techniques further include determining a distance between the first AP and each of the plurality of STAs based on the plurality of FTM messages.

20 Claims, 6 Drawing Sheets

FULL MESH FINE TIME MEASUREMENT

TECHNICAL FIELD

Embodiments presented in this disclosure generally relate to wireless communication. More specifically, embodiments disclosed herein relate to determining device positioning using fine time measurement (FTM).

BACKGROUND

FTM techniques can allow an initiating wireless station (STA) to perform ranging against a responding STA, and compute the relative positions. The STAs can each be any suitable wireless device, including a laptop computer, a smartphone, a tablet, an internet of things (IoT) device, a vehicle, a drone, another suitable user device, or a wireless network infrastructure device (e.g., a wireless access point (AP)). For example, at least one of the STAs can be an AP, which participates in the ranging process by time-stamping wireless messages as needed and negotiating range parameters, including burst size, burst frequency, and others. For example, the AP can time-stamp physical layer convergence protocol (PLCP) protocol data units (PPDUs). In order to be effective, however, FTM needs high bandwidth and to be executed for multiple iterations, which is costly if used for multiple STAs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
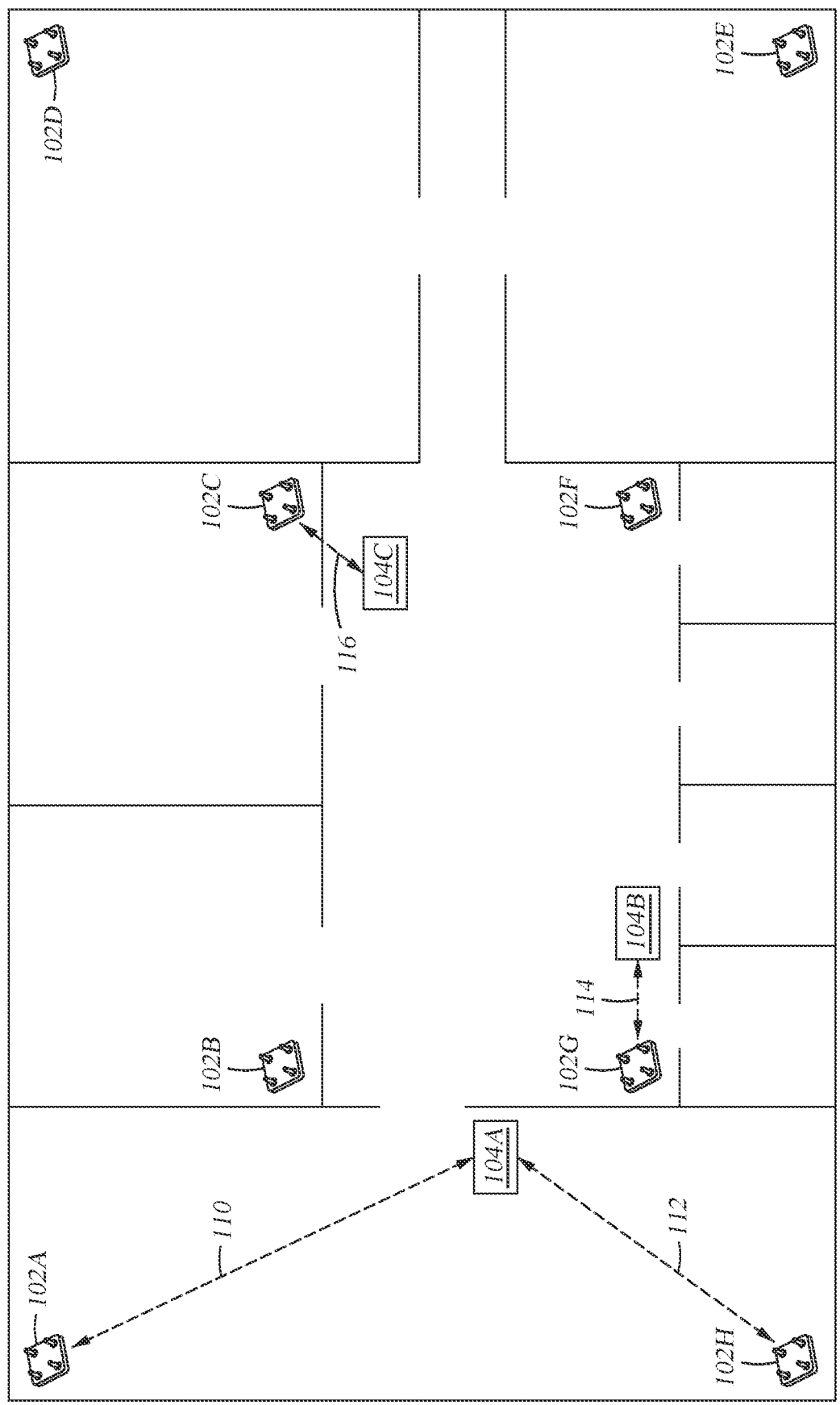
FIG. 1 illustrates a computing environment for FTM using broadcast and scheduling, according to one embodiment.

Embodiments include a method. The method includes defining a message schedule for fine time measurement (FTM) at a first wireless access point (AP). The method further includes broadcasting the message schedule to a plurality of wireless stations (STAs) from the first AP. The method further includes receiving, at the first AP, a plurality of FTM messages from the plurality of STAs, the messages transmitted by the plurality of STAs based on the message schedule. The method further includes determining a distance between the first AP and each of the plurality of STAs based on the plurality of FTM messages.

Embodiments further include another method. The method includes overhearing a plurality of FTM transmissions between a first AP and a first STA, at a second STA. The method further includes determining an interval between the plurality of FTM transmissions, at the second STA. The method further includes determining, at the second STA, a range between the first STA and the second STA based on the interval and the overheard plurality of FTM transmissions.

Embodiments further include a system. The system includes a processor and a memory having instructions stored thereon which, when executed on the processor, performs operations. The operations include defining a message schedule for FTM at a first AP. The operations further include broadcasting the message schedule to a plurality of STAs from the first AP. The operations further include receiving, at the first AP, a plurality of FTM messages from the plurality of STAs, the messages transmitted by the plurality of STAs based on the message schedule. The operations further include determining a distance between the first AP and each of the plurality of STAs based on the plurality of FTM messages.

Example Embodiments

In an embodiment, FTM techniques can be improved using broadcast transmission and scheduling. Existing FTM techniques typically require multiple messages for each pair of devices (e.g., each pair of STAs). An origin device sends a message to a destination device, the destination device responds to the origin device, and the timing of messages is used to determine ranging between the devices. This ends up as a quadratic process on the number of devices (e.g., an $O(N^2)$ process).

On or more techniques described herein improve on this by using broadcast transmission and AP scheduling to reduce the number of messages and improve FTM efficiency. For example, an AP can transmit an initial broadcast message to several destination devices (e.g., at the same time). The AP can orchestrate which destination device responds, when. This can significantly reduce the number of messages and greatly improve the efficiency of FTM techniques, as discussed further below with regard to FIGS. 3-6.

Further, as discussed below in relation to FIGS. 5-6, one or more techniques can be used to improve the privacy and security of FTM, along with the improved efficiency. For example, in existing techniques a listener could overhear a transmission from a destination device and use that transmission to locate the destination device. This can be improved by limiting FTM transmissions to devices that do not need to maintain location privacy (e.g., APs). In an embodiment, AP transmissions for FTM can be overheard by other STAs, and the other STAs can use those overheard transmissions to determine ranging to the APs. This allows STAs to determine ranging to APs, using FTM, without exposing the STAs themselves to location privacy concerns.

FIG. 1 illustrates a computing environment 100 for FTM using broadcast and scheduling, according to one embodiment. The computing environment 100 includes a number of APs 102A-H and a number of STAs 104A-C. Each STA 104A-C can determine its range from the APs using FTM techniques (e.g., by exchanging timestamped messages). Example FTM techniques are discussed in more detail with regard to FIGS. 3-6. For example, the STA 104A can use FTM techniques to estimate the length of the distance 110 between the STA 104A and the AP 102A.

The STA 104A can similarly use FTM techniques to estimate the distance 112 to the AP 102H. The STA 104B can use FTM techniques to estimate the distance 114 to the AP 102G. The STA 104C can use FTM techniques to estimate the distance 116 to the AP 102C. This positioning information can be used by the STAs for a number of management purposes, including selecting an AP for connection and configuring a variety of radio transmission and other parameter. The positioning information can also be used for numerous application purposes, including augmented reality, social networking, health care monitoring, inventory control, etc.

While FIG. 1 focuses on the use of APs and STAs for wireless radio communication, this is merely an example. Any suitable orchestrating device can be used, in place of or in addition to an AP. Further, any transmission technology could be used, including laser light, radio transmissions in additional spectrum (e.g., outside of the WiFi spectrum), or any other suitable transmission.

Figure 2:
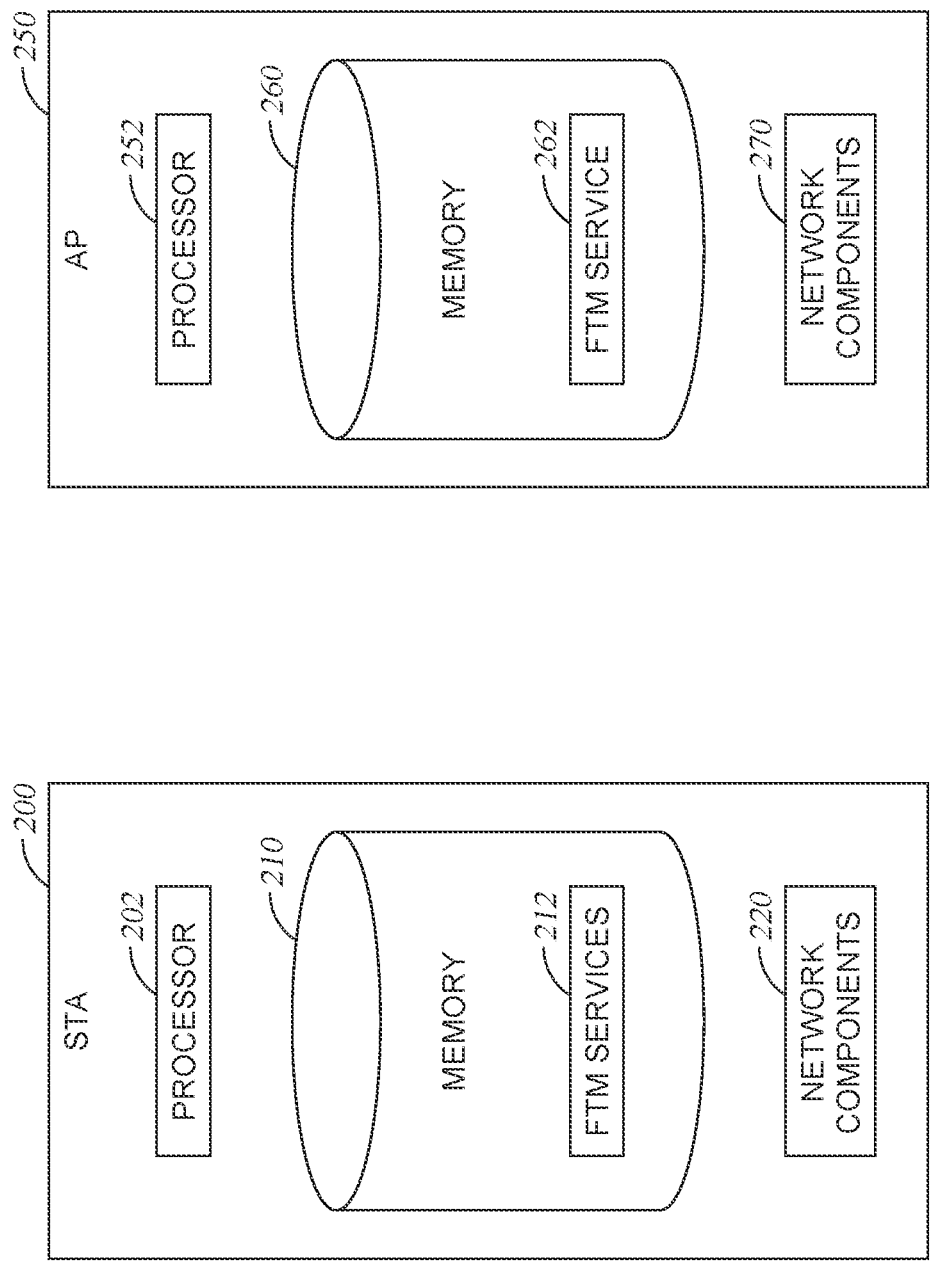
FIG. 2 illustrates an STA and an AP for FTM using broadcast and scheduling, according to one embodiment.

FIG. 2 illustrates an STA 200 and an AP 250 for FTM using broadcast and scheduling, according to one embodiment. In an embodiment, the STA 200 corresponds with any of the STAs 104A-C illustrated in FIG. 1. The STA 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the STA 200 to interface with a wireless communication network, as discussed above in relation to FIG. 1. For example, the network components 220 can include WiFi or cellular network interface components and associated software.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the STA 200. The program code is generally described as various functional "applications" or "modules" within the memory 210, although alternate implementations may have different functions and/or combinations of functions.

Within the memory 210, an FTM service 212 facilitates FTM using broadcast and scheduling, as discussed below in relation to FIGS. 3-6. FTM is merely one example of a suitable range finding technique, and other techniques can be used. The FTM service 212 facilitates identifying the range of the STA 200 from an AP (e.g., the AP 250) and facilitates identifying the location of the STA 200 using the range information.

The AP 250 includes a processor 252, a memory 260, and network components 270. The processor 252 generally retrieves and executes programming instructions stored in the memory 260. The processor 252 is included to be representative of a single central processing unit (CPU), multiple CPUs, a single CPU having multiple processing cores, graphics processing units (GPUs) having multiple execution paths, and the like.

The network components 270 include the components necessary for the AP 250 to interface with a wireless communication network, as discussed above in relation to FIG. 1. For example, the network components 270 can include WiFi or cellular network interface components and associated software.

Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory. The memory 260 generally includes program code for performing various functions related to use of the AP 250. The program code is generally described as various functional "applications" or "modules" within the memory 260, although alternate implementations may have different functions and/or combinations of functions. Within the memory 260, the FTM service 262 facilitates control of FTM using broadcast and scheduling, as discussed below in relation to FIGS. 3-6.

Figure 3:
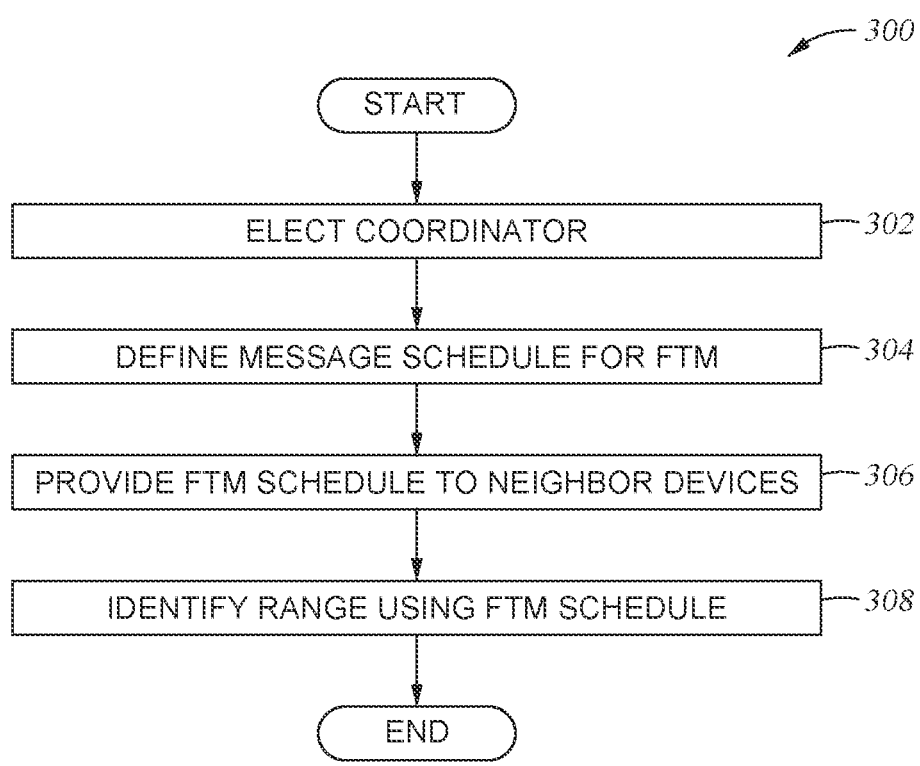
FIG. 3 is a flowchart illustrating FTM using broadcast and scheduling, according to one embodiment.

FIG. 3 is a flowchart 300 illustrating FTM using broadcast and scheduling, according to one embodiment. At block 302, an FTM service (e.g., the FTM service 262 illustrated in FIG. 2) elects a coordinator. For example, the FTM service can elect a leader AP, from among a group of APs (e.g., the APs 102A-H illustrated in FIG. 1). The FTM service can operate on an AP, on a suitable controller (e.g., a wireless local area network (WLAN) controller (WLC)), or on any other suitable device or combination of devices.

At block 304, the FTM service defines a message schedule for FTM. In an embodiment, the coordinator initiates FTM by broadcasting to multiple destination devices, and schedules which destination device responds, when. This is discussed further, below, with regard to FIG. 4. In an embodiment, the schedule can define an FTM sequence in terms of timing, frequency, or any other suitable characteristics. The schedule can be absolute (e.g., defining a short window (e.g., a few milliseconds) for various parties to transmit). The schedule can also be relative (e.g., defining transmission as a few milliseconds after receiving a previous message).

In an embodiment, the coordinator elected at block 302 defines the message schedule. Alternatively, or in addition, another network device (e.g., a controller) defines the message schedule. These are merely examples.

At block 306, the FTM service provides the FTM schedule to neighbor devices. In an embodiment, a coordinator AP transmits the schedule to neighboring devices (e.g., APs and STAs). For example, an AP can transmit the schedule as part of neighbor reports, other action frames (e.g., as part of FTM frames), or any other suitable transmission. This is merely an example, and any suitable device (e.g., an STA, another AP, or any other suitable device) can provide the FTM schedule.

At block 308, an FTM service (e.g., the FTM service 212 illustrated in FIG. 2), the FTM service, or both, identifies range between devices using the FTM schedule. For example, a coordinator AP can transmit the schedule to neighboring STAs and APs. These neighboring STAs and APs can follow the schedule to transmit, and receive, FTM messages and determine range between devices. This is discussed further, below, in relation to FIG. 4.

Figure 4:
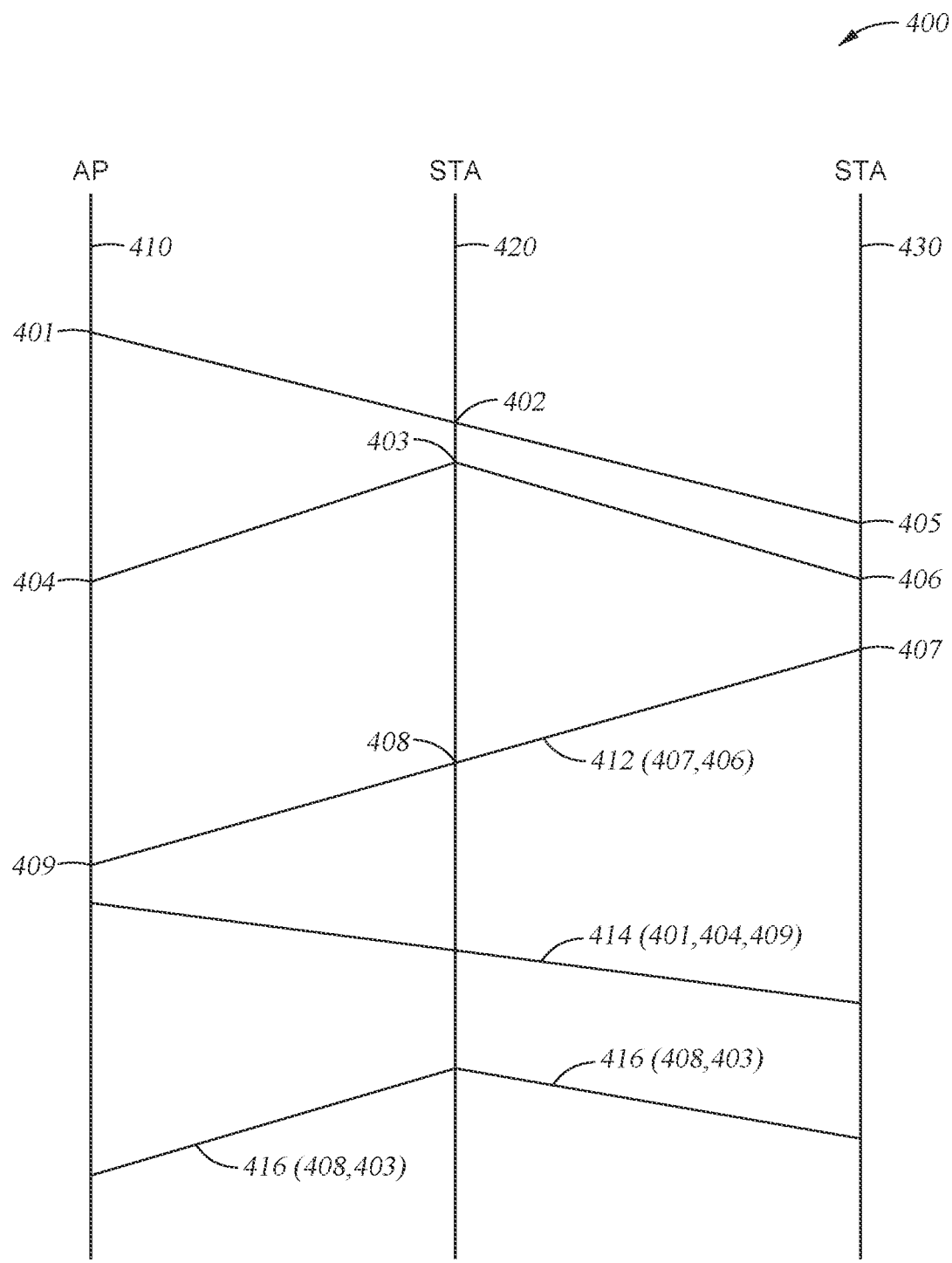
FIG. 4 is a message diagram illustrating FTM using broadcast and scheduling, according to one embodiment.

FIG. 4 is a message diagram 400 illustrating FTM using broadcast and scheduling, according to one embodiment. In an embodiment, the messaging diagram 400 illustrates one example of communications consistent with the flowchart 300 illustrated in FIG. 3. In an embodiment, an AP 410 acts as a coordinator of FTM transmissions for two STAs 420 and 430. In one embodiment, the STAs 420 and 430 are themselves APs associated with additional STAs (e.g., additional client devices). Alternatively, one or both of the STAs 420 and 430 can be client devices, or any other suitable network component. Further, while the coordinator is illustrated as the AP 410, any suitable network component can coordinate the FTM transmissions (e.g., a controller, a client device, or any other suitable network component).

In an embodiment, the AP 410 defines a message schedule for FTM. This is discussed further, above, in relation to block 304 illustrated in FIG. 3. At a time 401 the AP 410 transmits the message schedule to the STAs 420 and 430. For example, the AP 410 can broadcast a network message to the STAs 420 and 430 that includes the network message.

The STA 420 receives the message schedule at a time 402. The STA 430 receives the message schedule at a time 405. In an embodiment, the message schedule indicates the times at which the STAs 420 and 430 (e.g., APs as discussed above) should transmit FTM messages. For example, the STA 420 can transmit its FTM message at a time 403, and the message is received by both the AP 410 and the STA 430. The AP 410 receives the FTM message at a time 404 and the STA 430 receives the FTM message at a time 406.

In an embodiment, the message schedule further indicates that the STA 430 should transmit FTM messages at a time 407. The STA 430 follows the schedule and transmits an FTM message 412 at the time 407. In an embodiment, the FTM message 412 indicates the times 407 (e.g., when the STA 430 transmitted the FTM message 412) and 406 (e.g., when the STA 430 received the FTM message from the STA 420). The STA 420 receives the FTM message 412 from the STA 430 at a time 408, and the AP 410 receives the FTM message 412 from the STA 430 at a time 409.

Further, in an embodiment, the AP 410 transmits an FTM message 414 to the STAs 420 and 430. The FTM message 414 indicates the times 401 (e.g., when the AP 410 transmitted the message schedule), 404 (e.g., when the AP 410 received the FTM message from the STA 420), and 409 (e.g., when the AP 410 received the FTM message 412 from the STA 430). The STA 420 transmits an FTM message 416 to the AP 410 and the STA 430. The FTM message 416 indicates the times 408 (e.g., when the STA 420 received the FTM message 412 from the STA 430) and 403 (e.g., when the STA 420 transmitted the FTM message to the AP 410 and the STA 430).

In an embodiment, one or more of the AP 410, the STA 420, and STA 430 can use these FTM messages and indicated times to identify the range between the AP 410 and the STAs 420 and 430. For example, the AP 410, STA 420, and STA 430 can each calculate a distance to one of the other devices based on the measured timestamps 401-409.

Figure 5:
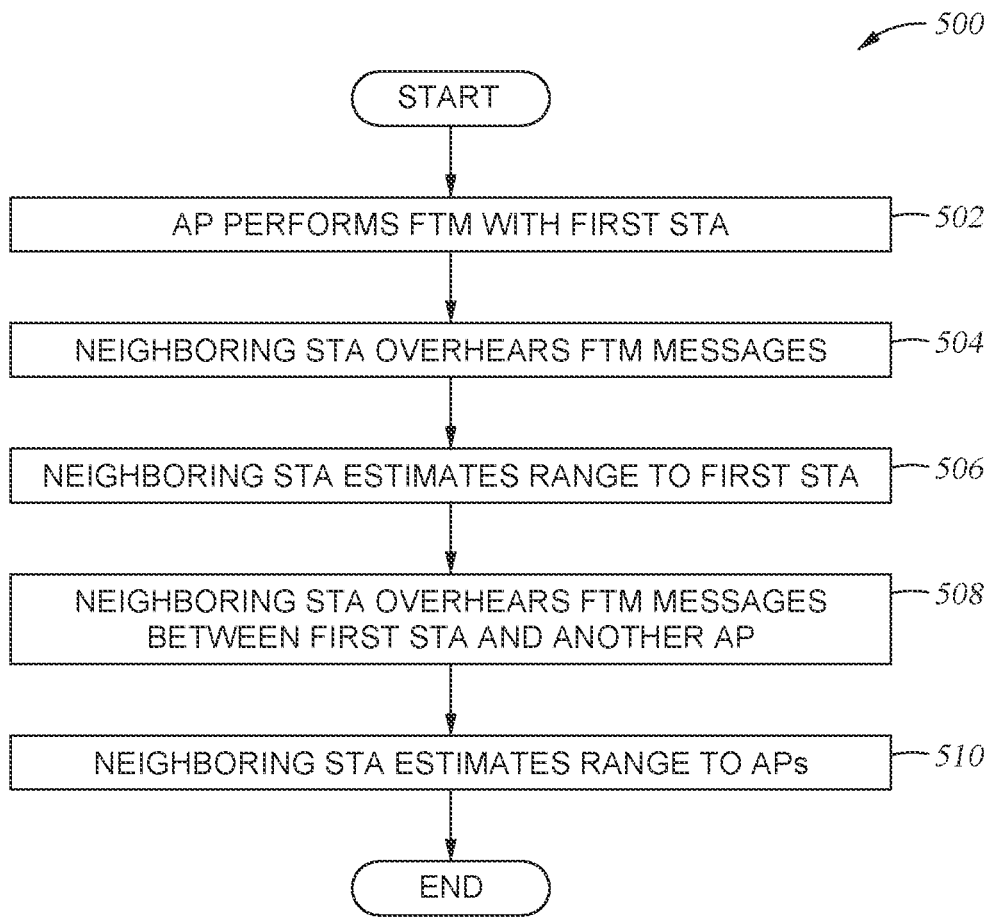
FIG. 5 is a flowchart further illustrating FTM using broadcast and scheduling, according to one embodiment.

FIG. 5 is a flowchart further illustrating FTM using broadcast and scheduling, according to one embodiment. At block 502 an FTM service (e.g., the FTM service 262 illustrated in FIG. 2) in an AP performs FTM with a first STA. For example, the FTM service can transmit one or more FTM messages between the AP and first STA. An AP is merely one example, and the FTM service can operate on any suitable device or combination of devices. Further, the first STA can itself be an AP, a client device, or any other suitable device.

At block 504, a neighboring STA overhears the FTM messages. For example, the neighboring STA can overhear the dialog between the AP and the first STA, and can also hear the timestamp and any location configuration information (LCI) data included in the messages. For example, the FTM message can include LCI data identifying the latitude and longitude (e.g., identified using a global positioning system (GPS) component or another suitable techniques), altitude (e.g., identified using an air pressure sensor or using any other suitable techniques), or any other suitable information for the AP and first STA. Further, the neighboring STA can overhear any acknowledgment messages (ACKs) sent between the first STA and the AP.

At block 508, the neighboring STA estimates a range to the first STA. For example, the neighboring STA can measure the mean interval between FTM messages (e.g., transmitted by the AP to the first STA, within a burst) and the mean interval to the STA ACK. Using the AP communicated timing information, the neighboring STA can estimate its range to the first STA. This is discussed further, below, with regard to FIG. 6.

At block 508, the neighboring STA overhears FTM messages between the first STA and another AP. In an embodiment, each STA is within range of multiple APs and uses FTM to identify a range to each of these APs. The neighboring STA can repeat the techniques discussed above in relation to blocks 502-506, for the first STA and another AP.

At block 510, the neighboring STA determines a range to the APs. In an embodiment, the neighboring STA has a hyperbolic comparison between distances from the first STA and multiple STAs, based on the overheard FTM messages. The neighboring STA can use these comparisons (e.g., of FTM messages between the first STA and multiple APs) to estimate the relative distance from the neighboring STA to each of the APs.

In an embodiment, these techniques allow a neighboring STA to identify distances to one or more APs, using FTM, without requiring the neighboring STA to itself transmit FTM messages. This allows the neighboring STA to preserve privacy, while APs (e.g., which do not share privacy concerns over location) transmit FTM messages. Further, while FIG. 5 focuses on transmission from an AP, this is merely an example. Any suitable device that does not have concerns with identifying its location (e.g., a digital sign, a geographic tag, an IoT device acting as a fixture, or any other suitable device) could transmit FTM messages and the neighboring STA could overhear these messages to identify a distance to the transmitting device.

Figure 6:
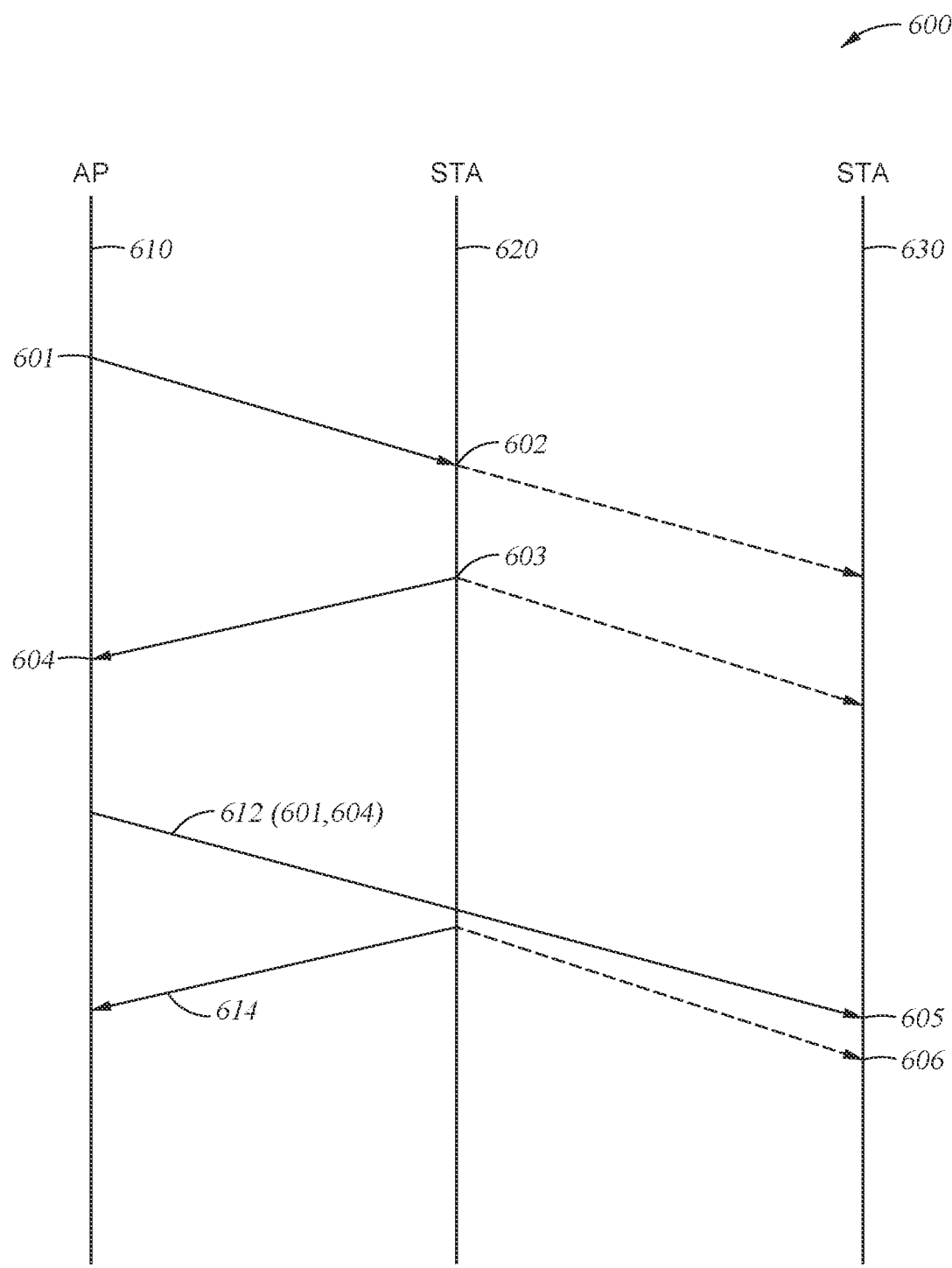
FIG. 6 is a message diagram further illustrating FTM using broadcast and scheduling, according to one embodiment.

FIG. 6 is a message diagram 600 further illustrating FTM using broadcast and scheduling, according to one embodiment. In an embodiment, the messaging diagram 600 illustrates one example of communications consistent with the flowchart 500 illustrated in FIG. 5. At a time 601, an AP 610 transmits an FTM message to an STA 620, which receives the message at a time 602. In an embodiment, this is a typical FTM message using existing techniques. Alternatively, the AP uses the techniques discussed above in relation to FIGS. 3-4 (e.g., broadcasting an FTM message to multiple STAs).

In an embodiment, another STA 630 overhears the FTM message from the AP 610 to the STA 620. Further, at a time 603 the STA 620 transmits its own FTM message to the AP 610, which receives that FTM message at a time 604. The STA 630 also overhears that FTM message, from the STA 620 to the AP 610.

In an embodiment, the AP 610 transmits an FTM message 612 to the STA 620. The FTM message 612 include the timestamps 601 (e.g., the time at which the AP 610 transmitted the FTM message to the STA 620) and 604 (e.g., the time at which the AP 610 received the responsive FTM message from the STA 620). The STA 630 overhears this FTM message 612 at a time 605. Further, the STA 620 transmits an ACK 614 back to the AP 610, and the STA 630 overhears this ACK 614 at a time 606.

In an embodiment, as discussed above in relation to block 506 illustrated in FIG. 5, the STA 630 uses the overheard FTM messages and timestamps between the STA 620 and the AP 610 to estimate the distance from the STA 630 to the STA 620. Further, as discussed above in relation to blocks 508 and 510 illustrated in FIG. 5, the STA 630 can overhear FTM messages between the STA 620 and additional APs, and can use those messages to estimate the distance from the STA 630 to the AP 610 and the additional APs.

While the techniques discussed above in relation to FIGS. 3-6 focus on use of a stationary AP, any (or all) of the device could be moving and these FTM techniques could be used to monitor relative distances. For example, any of the devices could be vehicles (e.g., cars, trucks, airplanes, ships, or any other suitable vehicles), drones, or any other suitable devices. The transmissions can also use any suitable radio access technology (RAT). WiFi transmission from an AP is merely one example. For example, cellular transmissions could be used, laser light could be used, or any other suitable RAT.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
defining a message schedule for fine time measurement (FTM) at a first wireless access point (AP);
broadcasting the message schedule to a plurality of wireless stations (STAs) from the first AP;
receiving, at the first AP, a plurality of FTM messages from the plurality of STAs, the messages transmitted by the plurality of STAs based on the message schedule; and
determining a distance between the first AP and each of the plurality of STAs based on the plurality of FTM messages.

2. The method of claim 1, wherein the plurality of STAs comprises a second AP, and wherein the second AP transmits FTM messages using the message schedule received from the first AP.

3. The method of claim 2, further comprising:
selecting the first AP as an orchestrator for FTM for the plurality of STAs.

4. The method of claim 2, wherein the message schedule defines at least one of: (i) a time or (ii) a frequency for the plurality of FTM messages from the plurality of STAs.

5. The method of claim 1, further comprising:
overhearing a first FTM transmission between the first AP and a first STA, of the plurality of STAs, at a second STA;
determining a range between the first STA and the second STA based on the overheard first FTM transmission.

6. The method of claim 5, further comprising:
overhearing a second FTM transmission between a second AP and the first STA, at the second STA; and
determining a range between the first AP and the second STA based on the overheard first and second FTM transmissions.

7. The method of claim 6, further comprising:
determining a range between the second AP and the second STA based on the overheard first and second FTM transmissions.

8. A method, comprising:
overhearing a plurality of fine time measurement (FTM) transmissions between a first wireless access point (AP) and a first wireless station (STA), at a second STA;
determining an interval between the plurality of FTM transmissions, at the second STA; and
determining, at the second STA, a range between the first STA and the second STA based on the interval and the overheard plurality of FTM transmissions.

9. The method of claim 8, further comprising:
overhearing a second plurality of FTM transmissions between a second AP and the first STA, at the second STA; and
determining a range between the first AP and the second STA based on the overheard first and second plurality of FTM transmissions.

10. The method of claim 9, further comprising:
determining a range between the second AP and the second STA based on the overheard first and second plurality of FTM transmissions.

11. The method of claim 8, further comprising:
defining a message schedule for FTM at the first AP;
broadcasting the message schedule to a plurality of STA from the first AP;
receiving, at the first AP, a plurality of FTM messages from the plurality of STAs, the messages transmitted by the plurality of STAs based on the message schedule; and
determining a distance between the first AP and each of the plurality of STAs based on the plurality of FTM messages.

12. The method of claim 11, wherein the plurality of STAs comprises a second AP, and wherein the second AP transmits FTM messages using the message schedule received from the first AP.

13. The method of claim 12, further comprising:
selecting the first AP as an orchestrator for FTM for the plurality of STAs.

14. A system, comprising:
a processor; and
a memory having instructions stored thereon which, when executed on the processor, performs operations comprising:
defining a message schedule for fine time measurement (FTM) at a first wireless access point (AP);
broadcasting the message schedule to a plurality of wireless stations (STAs) from the first AP;
receiving, at the first AP, a plurality of FTM messages from the plurality of STAs, the messages transmitted by the plurality of STAs based on the message schedule; and
determining a distance between the first AP and each of the plurality of STAs based on the plurality of FTM messages.

15. The system of claim 14, wherein the plurality of STAs comprises a second AP, and wherein the second AP transmits FTM messages using the message schedule received from the first AP.

16. The system of claim 15, the operations further comprising:
selecting the first AP as an orchestrator for FTM for the plurality of STAs.

17. The system of claim 15, wherein the message schedule defines at least one of: (i) a time or (ii) a frequency for the plurality of FTM messages from the plurality of STAs.

18. The system of claim 14, the operations further comprising:
overhearing a first FTM transmission between the first AP and a first STA, of the plurality of STAs, at a second STA;
determining a range between the first STA and the second STA based on the overheard first FTM transmission.

19. The system of claim 18, the operations further comprising:
overhearing a second FTM transmission between a second AP and the first STA, at the second STA; and
determining a range between the first AP and the second STA based on the overheard first and second FTM transmissions.

20. The system of claim 19, the operations further comprising:
determining a range between the second AP and the second STA based on the overheard first and second FTM transmissions.

* * * * *